United States Patent [19]

McAdams

[11] Patent Number: 4,822,141
[45] Date of Patent: Apr. 18, 1989

[54] LIQUID CRYSTAL BEAM SPLITTER

[75] Inventor: Richard L. McAdams, New Haven, Conn.

[73] Assignee: ITT Defense Communications, a division of ITT Corporation, Nutley, N.J.

[21] Appl. No.: 896,359

[22] Filed: Aug. 13, 1986

[51] Int. Cl.$^4$ ............................................. G02F 1/13
[52] U.S. Cl. .................................. 350/330; 350/375; 350/376
[58] Field of Search ................. 350/330, 339 R, 340, 350/375, 376

[56] References Cited

U.S. PATENT DOCUMENTS

| | | | |
|---|---|---|---|
| 3,364,433 | 1/1968 | Freund et al. | 350/330 |
| 4,066,334 | 1/1978 | Fray et al. | 350/330 |
| 4,214,819 | 7/1980 | Pohl et al. | 350/330 |
| 4,411,494 | 10/1983 | Crossland et al. | 350/340 |
| 4,556,288 | 12/1985 | Sekimura | 350/339 R |

OTHER PUBLICATIONS

R. B. Meyer, "Distortion of a Cholesteric Structure by a Magnetic Field," *Applied Physics Letters*, vol. 14, No. 7 (Apr., 1969), pp. 208–209.

*Primary Examiner*—John K. Corbin
*Assistant Examiner*—Martin Lerner
*Attorney, Agent, or Firm*—Robert A. Walsh; Thomas N. Twomey; Mary C. Werner

[57] ABSTRACT

A liquid crystal beam splitter includes a magnetic coil adapted to controllably orient, or tilt, the molecules of a layer of liquid crystal material and thereby detune the internal reflections of a polarized light beam component passing therethrough.

11 Claims, 2 Drawing Sheets

LIQUID CRYSTAL BEAM SPLITTER

BACKGROUND OF THE INVENTION

The present invention generally relates to a liquid crystal beam splitter and, in particular, relates to one such beam splitter that includes means for magnetically controlling the orientation of the liquid crystal molecules thereof.

The splitting of a light beam into the polarized components thereof by use of a layer of liquid crystal is known to be quite efficient. One particular design of such a light beam splitter has been described and discussed in U.S. patent application Ser. No. 795,150 filed on Nov. 5, 1985. This application is assigned to the assignee hereof and incorporated herein by reference. Therein a liquid crystal beam splitting cell is described that generally incorporates a number of index of refraction matching layers. These layers enhance the polarization splitting by reducing internal reflections and other deleterious effects caused by refraction index mismatches and impurities in the liquid crystal material. The directing of a light beam component according to the polarization thereof by a layer of liquid crystal material is, effectively, a bidirectional phenomena. Hence, by reversing the direction of the beam components, a liquid crystal beam splitter can be used as a beam combiner.

Liquid crystal beam splitters and combiners have been shown to be quite useful as a first and/or last stage of liquid crystal switching devices. Typical of such switching devices are those described in U.S. patent applications Ser. Nos. 795,157 and 795,154, both filed on Nov. 5, 1985 and assigned to the assignee hereof. These applications are incorporated herein by reference. The actual switching of a light beam, as discussed therein is effected by reorienting the polarization of the polarized components of a split incident light beam as the components pass through a polarization reorientation cell.

Since the liquid crystal beam splitting phenomena are primarily surface effects, the thickness of the liquid crystal material used in such devices is relatively small. The thickness of the liquid crystal material can, nevertheless, cause less than ideal beam splitting of an incident light beam. For example, for a layer of homeotropically aligned nematic liquid crystal material, the $T_E$ polarization of a light beam incident thereon at an angle at least equal to the critical angle is substantially completely reflected for a layer of liquid crystal material having a thickness greater than about 5 micrometers. However, such a thickness also effects the transmission of a small portion of $T_M$ polarized light along the same path as the $T_E$ polarized component. That is, the incident light beam is not perfectly split into the plane polarized components thereof. This impurity occurs because, in effect, the liquid crystal layer behaves similar to a well known Fabry-Perot etalon. Thus, the intensity of the unwanted reflected $T_M$ polarized component is a function of the reflection coefficients and the optical path difference (i.e. the thickness of the liquid crystal layer) between the reflections.

Consequently, in order to improve the beam splitting phenomena a liquid crystal beam splitter that reduces the reflected unwanted polarization component is highly desirable.

SUMMARY OF THE INVENTION

Accordingly, it is one object of the present invention to provide a liquid crystal beam splitter that substantially overcomes the above recited drawback.

This object is accomplished, at least in part, by a liquid crystal beam splitter including means for magnetically tilting the liquid crystal molecular alignment within the layer of liquid crystal thereof.

Other objects and advantages will become apparent to those skilled in the art from the following detailed description read in conjunction with the appended claims and the drawing attached hereto.

BRIEF DESCRIPTION OF THE DRAWING

The drawing, not drawn to scale, includes.

DETAILED DESCRIPTION OF THE INVENTION

Figure 1:
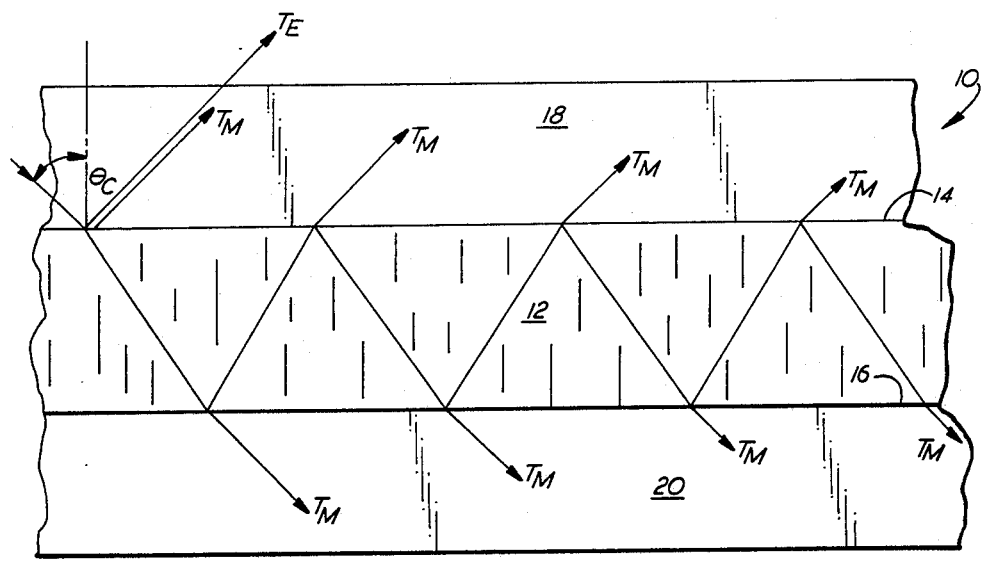
FIG. 1—a pictorial view of the splitting of an incident light beam into polarized components.

A typical liquid crystal beam splitter, generally indicated at 10 in FIG. 1, includes a layer 12 of liquid crystal material disposed between the inner surfaces 14 and 16, of first and second transparent members, 18 and 20, respectively.

In one particular beam splitter 10 embodiment, the layer 12 of liquid crystal material is a nematic liquid crystal material having the molecules thereof homeotropically aligned. That is, the molecules of the layer 12 of liquid crystal material have the longer axes thereof aligned substantially perpendicular to the inner surfaces, 14 and 16, of the first and second transparent members 18 and 20, respectively. Such a molecular alignment effectively determines the refractive index of the layer 12 of liquid crystal material. The effective refractive index of the layer 12 is, in fact, different for each plane polarized component of an incident light beam, i.e. the layer 12 of liquid crystal material is birefringent. As a result, since the critical angle $\alpha$ is dependent upon the indicies of refraction of the materials constituting an interface, the critical angle is different for each of the plane polarized components of the incident light beam. As well known, the critical angle is that minimum angle whereat an incident light beam is totally reflected upon impinging upon the interface.

In such a configuration, as shown in FIG. 1, the $T_E$ polarized component is, thus, substantially completely reflected at the interface between the first transparent member 18 and the layer 12 of liquid crystal material. Further, substantially all of the $T_M$ polarized component is transmitted across the layer 12 of liquid crystal material into the second transparent member 20.

However, due to the thickness of the layer 12 of liquid crystal material, small portions of the $T_M$ polarized light component are nonetheless reflected in a direction close to, or equal, that of the $T_E$ polarized component. As the $T_M$ component is continuously reflected the magnitude of each subsequently reflected $T_M$ component entering the first transparent member 18 is reduced. These multiple reflections, as it happens, are often sufficiently in-phase with each other so as to combine in a positive interference with each other. This combining by positive interference causes the $T_M$ component reflected along the path of the $T_E$ polarized component to substantially contaminate, i.e., reduce the purity, of the separated $T_E$ component and reduce the magnitude of the transmitted $T_M$ component. Consequently, the $T_M$ polarized component entering the second transparent member 20 tends to be more pure than the reflected $T_E$ component but, nevertheless, has a slightly reduced intensity due to the reflection losses within the layer 12 of liquid crystal material.

Figure 2:
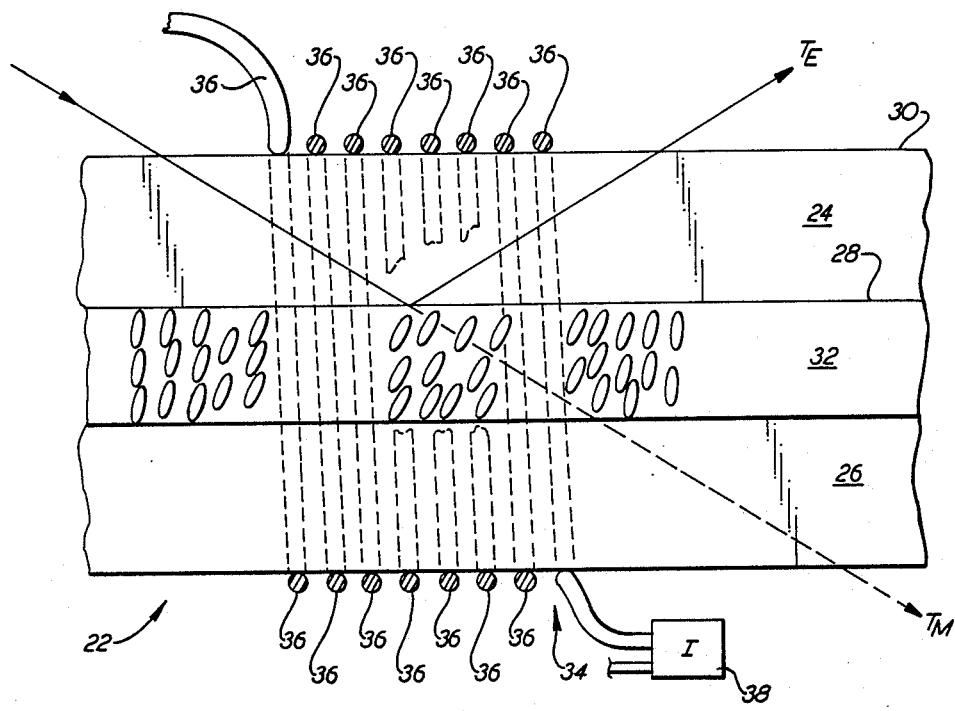
FIG. 2—a side view of a liquid crystal beam splitter embodying the principles of the present invention.

In one preferred embodiment, a liquid crystal beam splitter, generally indicated at 22 in FIG. 2 and embodying the principles of the present invention, includes first and second transparent members, 24 and 26, respectively, each having inner and outer surfaces 28 and 30, respectively, that are preferably optically flat, parallel and opposing each other, a layer 32 of liquid crystal material disposed between the inner surfaces 28 of the first and second members, 24 and 26, respectively, and means 34 for magnetically orienting the molecules of the layer 32 of liquid crystal material. Preferably, the molecules of the layer 32 of liquid crystal material are homeotropically arrayed.

In one embodiment, the means 34 for magnetically orienting the molecules of the layer 32 of liquid crystal material includes a plurality of electrically conductive coils 36 wrapped about the transparent numbers, 24 and 26, and means 38 for providing and controlling the electrical current flow in the coils 36. Preferably, the parameters discussed hereinafter with regard to the means 34 for magnetically orienting the molecules of the layer 32 of liquid crystal material can be adjusted either for each beam splitter fabricated or for each batch of beam splitters manufactured. This ability derives from the fact that once the beam splitter 22 is assembled all relevant parameters, i.e. the critical angle of the incident light beam, and the indices of refraction of the various elements thereof are fixed. Furthermore, as more fully discussed below the actual number of coils 36 provided can remain fixed since the magnitude of the magnetic field is dependent upon the magnitude of the current flowing therethrough.

In the embodiment described above the cross-section of the beam splitter 22 is taken to be a square, hence the magnetic field axial with the coils 36, i.e. parallel to the inner surfaces 28 and thus substantially perpendicular to the homeotropically aligned molecules is given by formula:

$$B = \frac{2\sqrt{2}}{\pi} \frac{\mu NI}{T}$$

wherein:
B = the magnitude of the magnetic field;
T = the transverse dimension of the beam splitter;
I = the current in each coil;
N = the number of turns; and
$\mu$ = the magnetic permeability of the transparent members.

Preferably, the number of coils 36 and the current flowing therethrough are adapted such that a magnetic field having a strength on the order of about one tesla is provided. This magnetic field strength is based on a typical transverse dimension of the beam splitter 22 of about 6 millimeters and results in a required amp-turns factor, i.e. NI, on the order of about 5,000.

Although this appears to be a rather substantial number, not only can the beam splitter 22 accommodate many turns but, since liquid crystals inherently relax slowly upon removal of a magnetic field, the current through the coils 36 can be pulsed to reduce the magnitude of the total current required to effect the molecular tilting.

In the event that the cross-sectional perimeter of the beam splitter 22 is rectangular then the magnetic field is determined by the formula:

$$B = \frac{2\mu NI}{\pi} \frac{\sqrt{a^2 + b^2}}{ab}$$

wherein:
B = the magnitude of the magnetic field;
I = the current in each coil;
N = the number of turns; and
$\mu$ = the magnetic permeability of the transparent members, and
a and b are the dimensions of the sides of the rectangle.

Further, if, as in some embodiments, the beam splitter 22 has a cross-section that is circular then the magnetic field is given by:

$$B = \frac{1}{2} \frac{\mu NI}{R}$$

wherein:
B = the magnitude of the magnetic field;
R = the radius of the body of the beam splitter;
I = the current in each coil;
N = the number of turns; and
$\mu$ = the magnetic permeability of the transparent members.

The general structure of a liquid crystal switching device is fully described and discussed in the aforementioned U.S. patent application Ser. Nos. 795,154 and 795,157 filed on Nov. 5, 1985. Effectively, such a device includes a beam splitter that receives an incident light beam from either a first port or a second port. The incident light beam is split into the polarized components thereof. The polarized components are then incident upon polarization reorientation cells. Preferably, the components are incident, effectively, perpendicular to the plane of the polarization reorientation cells. The polarized components exiting the polarization reorientation cells, regardless of the state of those cells, are reflected by total internal reflection into a light beam combiner. By appropriately controlling the polarization reorientation cells, and thus the polarization of the components of the light beam exiting therefrom, an incident light beam can be directed to one of first or second output ports via a light beam combiner.

The beam splitter 22 effectively magnetically adjusts, i.e. tilts, the molecules of the layer 32 of liquid crystal material to change the optical path length between the inner surfaces 28. Hence, the internal reflections dependent upon that particular length are reduced. However, it is possible that the overall dimensions of the liquid crystal device are such that the magnetic field, axial with the coils 36, along the layer 32 of liquid crystal material could interfere with the switching in the polarization reorientation cells that also include layers of liquid crystal material.

This interference can be substantially completely eliminated by ensuring that the magnetic field in the beam splitter is established perpendicular to the inner surfaces 28 of the transparent members, 24 and 26, and thus, substantially completely isolated from the polarization reorientation cells.

Figure 3:
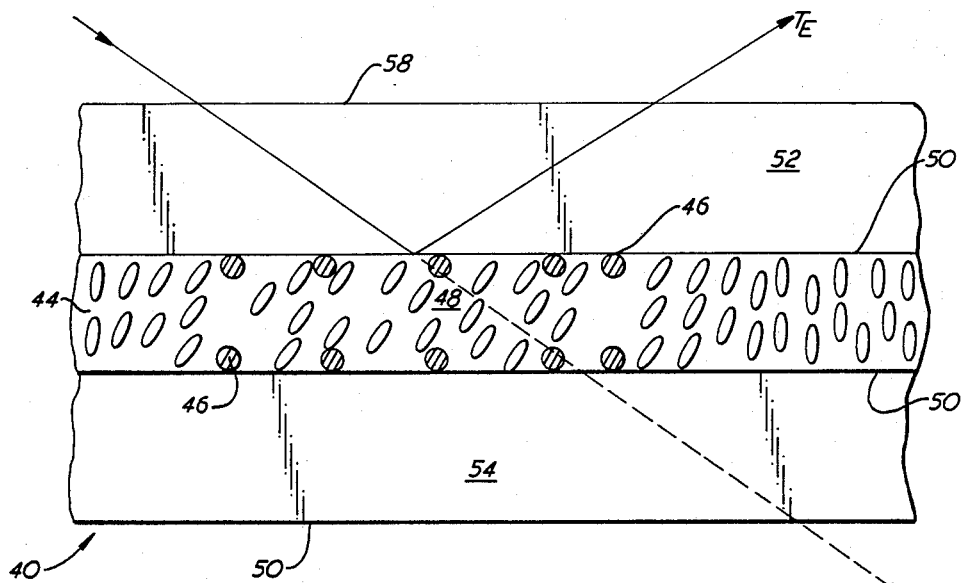
FIG. 3—a side view of another liquid crystal beam splitter embodying the principles of the present invention.
Figure 4:
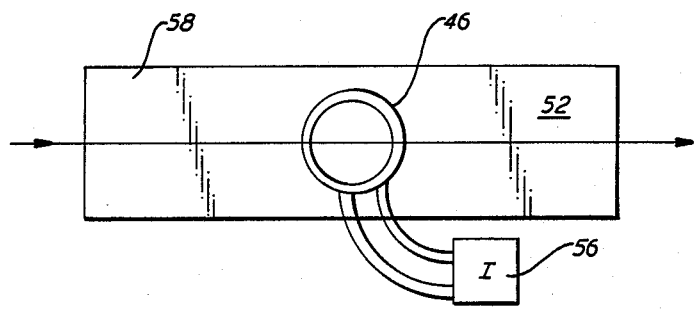
FIG. 4—a top view of a liquid crystal beam splitter such as that shown in FIG. 3.

A liquid crystal beam splitter, particularly adapted to provide such isolation is generally indicated at 40 in FIGS. 3 and 4 embodying the principles of the present invention, includes a means 42 for magnetically orienting the molecules of a layer 44 of homogenously aligned liquid crystal material that accomplishes the desired isolation with respect to other elements, such as polarization reorientation cells, proximate thereto. The means 42 includes a current source 56 that controls the magnitude of the magnetic field. In such an embodiment, a plurality of electrically conductive coils 46 is disposed to encompass a portion 48 of the layer 44 of liquid crystal material whereupon an incident light beam is directed. Similar to the beam splitter 22 shown in FIG. 2, the beam splitter 40 includes the layer 44 of liquid crystal material disposed between the inner surfaces 50 of the first and second transparent members, 52 and 54, respectively.

In this embodiment, since the magnetic field is perpendicular to the transparent members, i.e. axial with the coils 46, fringing magnetic fields external to the coils 46 are minimal and do not interfere with the polarization reorientation means. The coils 46 can, alternatively, be disposed on an outer surface 58 of the transparent members, 52 or 54, or embedded therewithin. Furthermore, the exact direction of the magnetic field is actually immaterial so long as the magnitude of the field is sufficient to effect the tilting, or partial rotation, of the molecules of the layer 44 of liquid crystal material with respect to the inner surfaces 50. Hence, the coils 46, as shown in FIGS. 3 and 4, effectively tune the reflections between the inner surfaces 50 by slightly reorienting the liquid crystal molecules. Thus, the beam splitter 40 is tuned to eliminate the internal reflection of the $T_M$ polarized components by changing the effective optical path length between the reflections.

Although the present invention has been described with respect to particular embodiments other arrangements and configurations may also be developed that, nevertheless, do not depart from the spirit and scope of the present invention. Hence, the present invention is deemed limited only by the appended claims and the reasonable interpretation thereof.

What is claimed is:

1. A liquid crystal beam splitter comprising:
   first and second transparent members each having an inner and an outer surface;
   a liquid crystal material disposed between said inner surfaces;
   an electrically conductive coil wrapped in contact with said transparent members;
   means for providing an electric current to said coil to establish a magnetic field within the liquid crystal material.

2. Beam splitter as claimed in claim 1 wherein said electrically conductive coil is wrapped on said outer surfaces of said transparent members.

3. Beam splitter as claimed in claim 1 wherein said coil is square.

4. Beam splitter as claimed in claim 1 wherein said coil is are rectangular.

5. Beam splitter as claimed in claim 1 wherein said coil is circular.

6. Beam splitter as claimed in claim 1 wherein said coil is circular.

7. A liquid crystal beam splitter comprising:
   first and second transparent members, said first and second transparent members having a layer of liquid crystal material disposed therebetween; and
   means for tilting the molecules of said liquid crystal material whereby the purity of the polarized components of an incident light beam split thereby is increased, said means including
   a plurality of electrically conductive coils disposed between said transparent members and enclosing a portion of said liquid material, and
   means for providing an electric current to said coils, said coils and said providing means establishing a magnetic field within said layer of liquid crystal material.

8. Beam splitter as claimed in claim 7 wherein said layer of liquid crystal material is disposed between inner surfaces of said transparent members and said coils are disposed such that said magnetic field is substantially parallel with said inner surfaces.

9. Beam splitter as claimed in claim 7 wherein said layer of liquid crystal material is disposed between inner surfaces of said transparent members and said coils are disposed such that said magnetic field is substantially perpendicular to said inner surfaces.

10. Beam splitter as claimed in claim 7 wherein said layer of liquid crystal material is homeotropically aligned.

11. A liquid crystal beam splitter comprising:
    first and second transparent members, said first and second transparent members having a layer of liquid crystal material disposed therebetween; and
    means for tilting the molecules of said liquid crystal material whereby the purity of the polarized components of an incident light beam split thereby is increased, said means including
    a plurality of electrically conductive coils disposed within at least one of said transparent members, and
    means for providing an electric current to said coils, said coils and said providing means establishing a magnetic field within said layer of liquid crystal material.

* * * * *